(12) United States Patent
Polevoy et al.

(10) Patent No.: US 12,093,141 B2
(45) Date of Patent: Sep. 17, 2024

(54) SYSTEMS AND METHODS FOR DIRECTORY SERVICE BACKUP AND RECOVERY

(71) Applicant: CAYOSOFT, INC., Westerville, OH (US)

(72) Inventors: Andrey Mikhaylovich Polevoy, Kishinev (MD); Robert John Bobel, III, Westerville, OH (US); Alexander Vadimovich Tsvetkov, Kiev (UA)

(73) Assignee: CAYOSOFT, INC., Westerville, OH (US)

( * ) Notice: Subject to any disclaimer, the term of this patent is extended or adjusted under 35 U.S.C. 154(b) by 0 days.

(21) Appl. No.: 18/116,573

(22) Filed: Mar. 2, 2023

(65) Prior Publication Data
US 2023/0281087 A1    Sep. 7, 2023

Related U.S. Application Data

(60) Provisional application No. 63/315,748, filed on Mar. 2, 2022.

(51) Int. Cl.
*G06F 11/14* (2006.01)

(52) U.S. Cl.
CPC ...... *G06F 11/1469* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,159,234 B1 | 1/2007 | Murphy et al. | |
| 8,191,078 B1 | 5/2012 | Cullen et al. | |
| 8,332,442 B1 | 12/2012 | Greene | |
| 9,053,236 B1 | 6/2015 | Covarrubias et al. | |
| 10,346,085 B1 | 7/2019 | Teverovsky et al. | |
| 2004/0153709 A1 | 8/2004 | Burton-Krahn | |
| 2018/0103033 A1 | 4/2018 | Kalitin et al. | |

OTHER PUBLICATIONS

WIPO, International Search Report and Written Opinion issued Jun. 21, 2023 which pertains to PCT Application No. PCT/US2023/014339, filed Mar. 2, 2023. 18 pages.

*Primary Examiner* — Eddy Cheung
(74) *Attorney, Agent, or Firm* — Thompson Hine LLP

(57) ABSTRACT

Various implementations implement a standby directory service. For example, an example process may include obtaining user data associated with an activity of a user via a sensor in a physical environment. The process may further include, at a device including one or more processors, determining that an interruption event has occurred at a host directory service, wherein the device and the host directory service are communicatively coupled via a first network protocol associated with a first network, and in response to determining that the interruption event has occurred at the host directory service, implementing a standby directory service, wherein the standby directory service is generated and updated via a second network protocol that is different than the first network protocol.

32 Claims, 13 Drawing Sheets

SYSTEMS AND METHODS FOR DIRECTORY SERVICE BACKUP AND RECOVERY

RELATED APPLICATIONS

This patent application claims the benefit of U.S. Provisional Application No. 63/315,748 filed on Mar. 2, 2022, entitled "SYSTEMS AND METHODS FOR INSTANT DIRECTORY SERVICE RECOVERY AFTER A RANSOMWARE OR OTHER CATASTROPHIC OUTAGE," which is incorporated herein by this reference in its entirety.

TECHNICAL FIELD

The present invention generally relates to computers and computer software, and more specifically, to methods, systems, and computer program products for implementing standby directory services.

BACKGROUND

A directory service is the most widely adopted method used by business organizations to authenticate user credentials (e.g., verify usernames and passwords) and authorize user access to critical business resources (e.g., electronic documents, communication and email systems, databases, applications, devices, physical access, etc.). In a modern business environment, access to such critical business resources is integral to conducting business operations, and an outage, such as a malware attack, of the directory service may cause business operations to grind to a halt until the directory service may be restored or an alternative directory service may be activated (e.g., directory recovery). Business outages caused by directory service outages almost certainly incur a heavy price in terms of lost sales, reputation, embarrassment, and lost business opportunities.

Because of the financial impact a directory services outage causes, directory services have become a favorite target for ransomware attackers for the purpose of extortion or attacks aimed at simply destroying the directory service itself. Less often, but still possible, directory service outages may also be caused by data corruption or mistakes made by directory service administrators.

The cost of a directory service outage may be determined by the duration of the associated business outage and costs needed to restore authentication and authorization service to users. Minimizing the time taken to restore directory services therefore minimizes the associated costs of an outage.

The time it takes from a directory outage to the time the directory is recovered and again allow the organization to resume business operations determines the cost the organization incurs for lost business activity. Hence the faster the directory may be recovered the lower the cost of such an outage to the organization. Ideally, an easy to create, isolated standby directory service would be available so in the event of an outage of the current directory service, user access requests could instantly be re-directed to the standby directory service.

One popular approach to directory recovery is to use a backup and recovery software program to backup each directory server, or specific data or files from each directory server that may then be later recovered to a different sever that will serve as replacement for the directory server being recovered. These programs work well, however, they require a complex orchestration of recovery steps including manual creation of servers, virtual servers, network settings by an administrator(s) of the software so that each directory server that is backed-up may be recovered. Another drawback to traditional backup and recovery software programs is that it is unknown if a recovery will be successful until the recovery is actually attempted.

SUMMARY

Various implementations disclosed herein include devices, systems, and methods that create and/or update standby directory services on an isolated network from an existing active directory service for the purpose of minimizing the recovery time, complexity, and cost of recovery after an outage of the active directory service.

In general, one innovative aspect of the subject matter described in this specification may be embodied in methods that include the actions of, at a directory service backup device including one or more processors, receiving, from a client device, a backup request for a host directory service, wherein the client device, the host directory service, and the directory service backup device are communicatively coupled via a first network protocol associated with a first network. The actions may further include providing, for display at the client device, a directory service backup user interface that includes a plurality of backup and recovery options that are selectable by a user. The actions may further include determining backup and recovery instructions associated with the host directory service based on the plurality of backup and recovery options selected by the user. The actions may further include determining setup instructions for a configuration of a standby directory service based on the determined backup and recovery instructions. The actions may further include generating, based on the setup instructions, the standby directory service via a second network protocol associated with a second network that is different than the first network protocol.

These and other embodiments may each optionally include one or more of the following features.

In some embodiments of the invention, the actions may further include detecting an interruption event at the host directory service, and in response to detecting the interruption event, implementing the standby directory service for the host directory service.

In some embodiments of the invention, determining that the interruption event has occurred is based on at least one of determining irreversible changes of schema occurred at the host directory service, determining a number of irreversible changes of objects at the host directory service exceeded a threshold, or determining that a natural disaster occurred at a location of the host directory service.

In some embodiments of the invention, the actions may further include, in response to implementing the standby directory service for the host directory service, iteratively performing a standby event process.

In some embodiments of the invention, in response to implementing the standby directory service for the host directory service, iteratively performing a standby event process. In some embodiments of the invention, implementing the standby directory service for the host directory service includes recovering directory data and the metadata corresponding to network infrastructure based on the determined backup and recovery instructions.

In some embodiments of the invention, the second network includes an isolated recovery environment that is separated from the first network. In some embodiments of the invention, the standby directory service is automatically updated based on a schedule selected from the plurality of backup and recovery options at the client device.

In some embodiments of the invention, the plurality of backup and recovery options includes at least one of a scheduling feature, a file integrity validation feature, target machine location settings, recovery site options, and backup encryption features.

In some embodiments of the invention, the setup instructions for initiating the standby directory service are configured to automatically modify network settings associated with the host directory service to use the standby directory service in place of the host directory service.

In some embodiments of the invention, the backup request for the host directory service is automatically initiated based on a predetermined schedule. In some embodiments of the invention, the backup request for the host directory service is automatically initiated based on detected changes of objects associated with the host directory service.

In some embodiments of the invention, the standby directory service includes a virtual machine or a set of virtual machines and corresponding network infrastructure elements, wherein the corresponding network infrastructure elements includes at least one of network switches, storages, and firewalls.

In some embodiments of the invention, the actions may further include determining that a portion of directory service data was removed for a particular account, implementing the standby directory service for the host directory service, identifying the portion of directory service data that was removed, and updating the standby directory service based on the identified portion of directory service data.

In general, one innovative aspect of the subject matter described in this specification may be embodied in methods that include the actions of, at a device including one or more processors, determining that an interruption event has occurred at a host directory service, wherein the device and the host directory service are communicatively coupled via a first network protocol associated with a first network. The actions may further include, in response to determining that the interruption event has occurred at the host directory service, implementing a standby directory service, wherein the standby directory service is generated and updated via a second network protocol that is different than the first network protocol.

In some embodiments of the invention, the actions may further include, in response to implementing the standby directory service for the host directory service, iteratively performing a standby event process for a restored network environment associated with the standby directory service.

In some embodiments of the invention, the standby event process includes at least one of installing additional backup and recovery software, performing a potential threat analysis on the first network, performing a data and service consistency check, and sending a notification to a client device.

In some embodiments of the invention, the interruption event is determined based on detecting changes of one or more objects associated with the host directory service.

In some embodiments of the invention, determining that the interruption event has occurred is based on at least one of determining irreversible changes of schema occurred at the host directory service, determining a number of irreversible changes of objects at the host directory service exceeded a threshold, or determining that a natural disaster occurred at a location of the host directory service.

In some embodiments of the invention, the host directory service includes a set of domain controllers and metadata corresponding to network infrastructure and additional services associated with the host directory service.

In some embodiments of the invention, implementing the standby directory service for the host directory service includes recovering directory data and the metadata corresponding to each domain controller based on determined backup and recovery instructions.

In some embodiments of the invention, the second network includes an isolated recovery environment that is separated from the first network.

In some embodiments of the invention, the standby directory service is automatically updated based on a schedule selected from a plurality of backup and recovery options at a client device.

In some embodiments of the invention, setup instructions for initiating the standby directory service are configured to automatically modify network settings associated with the host directory service to use the standby directory service in place of the host directory service.

In some embodiments of the invention, the standby directory service includes a virtual machine or a set of virtual machines and corresponding network infrastructure elements, wherein the corresponding network infrastructure elements includes at least one of network switches, storages, and firewalls.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the one or more processors to perform or cause performance of any of the methods described herein. In accordance with some implementations, a device includes: one or more processors, a non-transitory memory, and means for performing or causing performance of any of the methods described herein.

BRIEF DESCRIPTION OF DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
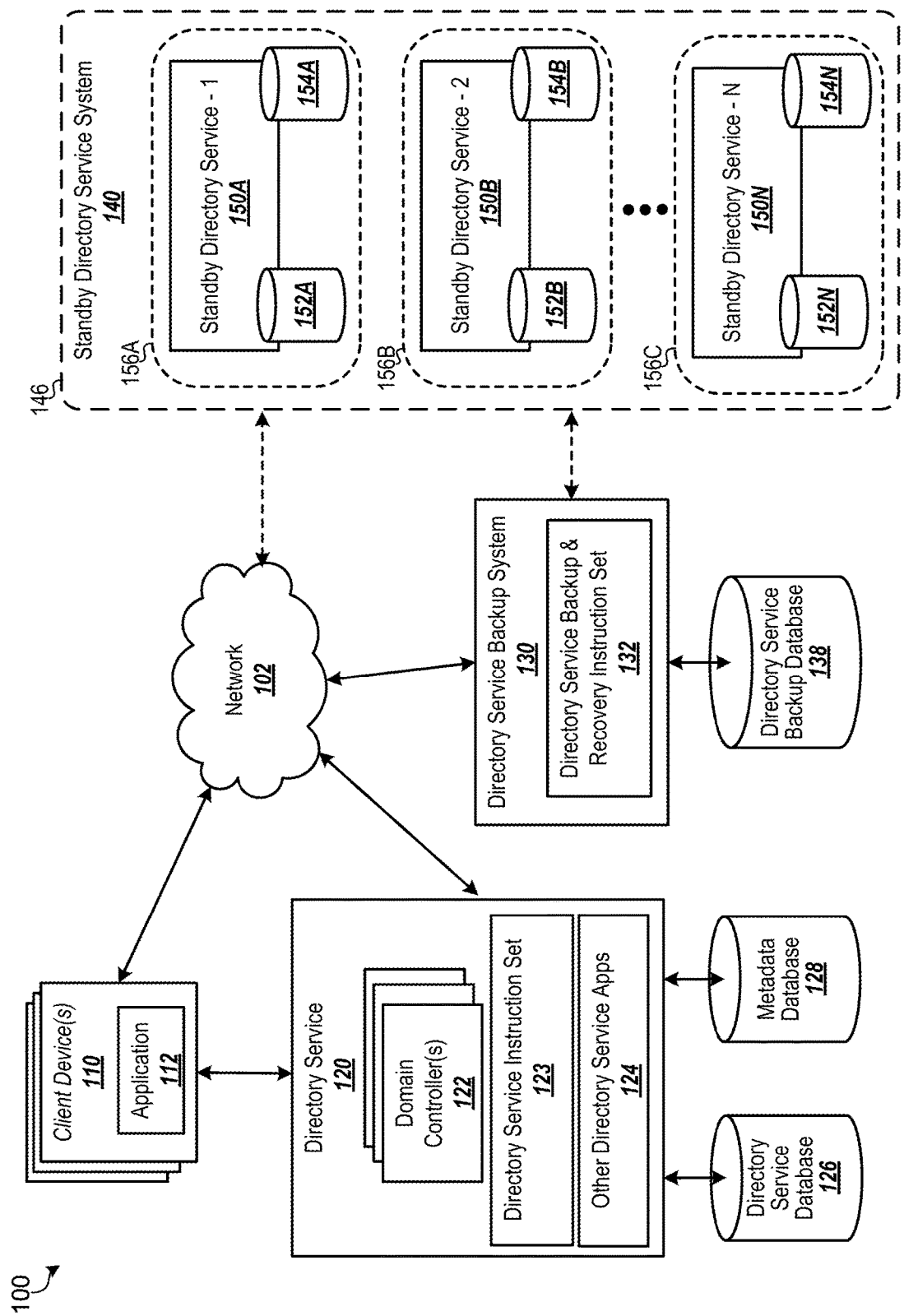
FIG. 1 illustrates an exemplary environment for implementing a standby directory service process, according to embodiments of the invention.

Information Technology (IT) administrators aim to implement automated and dynamic computing systems that ensure authentication and authorization services provided by a directory service remain highly available. A highly available directory service enables users (e.g., employees and other types of associates) to continuously access the organization's business resources needed for the smooth functioning of the business. Because a directory service is the primary means of facilitating critical access to resources, any failure or outage of the directory service poses significant risks and potential cost burden for the organization, and can cause reputational harm. The risks and costs from a directory failure are associated with both the cessation of normal business operations and the expenses involved in restoring authentication and authorization services to a working state. To mitigate such risks and costs, improved methods, systems, and computer program products are described in this document, which involve creating and maintaining one or more standby directory services on a network isolated from the primary directory service. These standby directory services act as an alternative directory service, minimizing the recovery time, complexity, and cost of recovery after an outage of the primary directory service. While the primary directory service may be within an organization's internal network standby directories could be inside or outside of the organization's internal network for example in the cloud.

Some embodiments of the invention relate to controlling and automating the state of physical or virtual servers, operating settings and services, network configuration, directory data, or other data associated with the original directory service or a plethora of standby directory services then take actions against the original directory service or any standby directory service(s) to reduce power consumption, identify configuration or security problems, change security settings, change directory data, redirect requests to the existing active directory service to one of the standby directory services, reduce computing resource costs or other required management tasks.

Some embodiments of the invention relate to applying updates to a standby directory service(s) where collected changes from the existing primary directory service may be examined by an administrator or others within the organization, who may approve, report-on or decline the application of one or more changes from being applied during by updates to one or more standby directory services. Additionally, or alternatively, in some embodiments of the invention, an IT administrator may also choose to have all changes automatically applied.

Some embodiments of the invention relate to switching to a clone directory (including clone creation) in case of critical failure of logical structure (schema changes, massive changes of objects) or in case of critical failure of physical infrastructure like all domain controllers are infected/not operational. An original directory can be replaced with a clone that has fewer domain controllers (e.g., in a cloned directory service, a directory service may need at least one domain controller for each domain in the active directory forest.), but it is not feasible to replace individual domain controllers in host directory with individual domain controllers in the cloned directory. Typically, if there is a disaster that requires restoring of the whole forest (e.g., in this case switching to a clone), it means that a directory service as a whole should be restored and/or replaced.

FIG. 1 is an example environment 100 for implementing a standby directory service process, according to embodiments of the invention. The example environment 100 includes a one or more client device(s) 110, a directory service 120, and a directory service backup device 130, that communicate over a data communication network 102, e.g., a local area network (LAN), a wide area network (WAN), the Internet, a mobile network, or a combination thereof. The example environment 100 further includes a standby directory service system 140 (e.g., a cloud provider network) that communicates over an isolated data communication network, that may be isolated from the data communications of network 102 (e.g., an isolated network, isolated recovery environment, virtual machine network, etc.). In some implementations, data communications from the standby directory service system 140 may be communicatively coupled to other systems/servers/devices of the environment 100 utilizing network 102 via a connection to an isolated network (e.g., a router may be rerouted via the IP address). In the exemplary implementation illustrated in FIG. 1, the host directory service network (e.g., directory service 120) is isolated from the standby directory service system 140. For example, the standby system may run on a separate/isolated network than the host/client system to be protected from a ransomware attack, but also protect from conflicts between a primary directory service and any of the secondary directory services which are effectively clones and cannot co-exist on the same network.

The one or more client device(s) 110 (e.g., a device used by a user or client to initiate backup and recovery, such as an IT administrator) may include a desktop computer, a laptop computer, a server, or a mobile device, such as a smartphone, tablet computer, and/or other types of mobile devices. The one or more client device(s) 110 includes and/or be able to access or use applications, such as the application 112, for managing a backup and recovery request to/from the directory service backup system 130, as well as direct access to the directory service 120. The one or more client device(s) 110 may include and/or be able to access or use other applications. Additionally, or alternatively, the one or more client device(s) 110 or the application 112 may be a cloud-based application hosted on a host server or web browser accessed by the user/client.

The one or more client device(s) 110 initiates a backup and recovery request by a user via application 112. In some implementations of the invention, software interfaces (e.g., a directory service backup user interface) on the one or more client device(s) 110 may allow an administrator to define, re-configure, create, update, and delete any and all settings needed to create a schedule for execution of the creation of standby directories. The software interfaces may include a programmatic trigger capability through an application program interface (API) for the collection of the required information from the original directory service. In some implementations, all necessary directory service components may be created and/or update among a plethora of isolated network standby directory service(s) replicas. Example screenshots of a standby directory service backup user interface is further discussed herein with reference to FIGS. 2-10. By updating the standby directory service(s), changes made to the existing active directory service will be incorporated into the standby directory service reducing or eliminating difference between the original directory service and the replica(s).

The directory service 120 may be a shared information infrastructure for locating, managing, administering, and organizing computing objects of a computing environment 100. The directory service 120 may include a set of domain controller(s) 122, a directory service instruction set 123, and other directory service applications 124. The directory service 120 may include a set of domains to store the computing objects such as the directory service database 126. The computing objects may represent computing resources such as users (e.g., user accounts), groups, devices (e.g., desktops, printers), data storage objects (e.g., files, records), other objects, or a combination thereof. Each computing object may be associated with identification data (e.g., object name, object ID, and type), access control data (e.g., permissions), membership data (e.g., group membership), other data, or a combination thereof. In one example, directory service 120 may function as a centralized authentication mechanism that enables one or more client devices 110 to access or use computing objects within computing environment 100. Each user or device (e.g., client device 110) may authenticate with directory service 120 to access shared resources over a network without individually authenticating to each shared resource. In some implementations, the other directory service applications 124 (e.g., additional software applications that may be in place alongside or in conjunction with the original directory service 120) may also be needed by a standby directory service on an isolated network if the other directory service applications 124 are activated for backup and restore.

Directory service 120 may support proprietary protocols, standardized protocols, or a combination thereof. In one example, directory service 120 may be the same or similar to Microsoft® Active Directory® and may support client devices that run Microsoft Windows®, Linux®, other operating system, or a combination thereof. In another example, directory service 120 may be any directory service that supports a directory access protocol (DAP), such as the Lightweight Directory Access Protocol (LDAP). LDAP may be an industry standard application protocol for accessing and maintaining distributed directory information services in a vendor-neutral manner over an Internet Protocol (IP) network (e.g., network 102).

The directory service database 126 may include objects such as directory objects and/or domain objects. Objects may be typically electronic representations of real-world items that are used for network and resource identity and access management. The metadata database 128, or similar storage devices associated with the directory service 120, may store metadata information associated with the directory service 120. The metadata information associated with the directory service 120 may include DNS configuration data, FSMO role configuration data, site topology, partition information, domain controller configurations, network adaptor settings, operating system settings, security settings, directory service database 126 details, SYSVOL, DNS zones, delegations, applications that consume directory data (e.g., Microsoft Azure® AD Connect synchronization solution), and the like. Alternatively, in some implementations, the metadata information stored in the metadata database 128 may be stored in other components (e.g., files and folders found on the domain controller's hard drive) rather than a separate storage system (e.g., metadata database 128).

The directory service backup system 130 may include a directory service backup & recovery instruction set 132. The directory service backup & recovery instruction set 132 is configured to create and store backup(s) of an original directory service 120 in the directory service backup database 138. The backup(s) of the original directory service 120 may include all information required to create one or more working standby directory service(s) (e.g., standby directory services 150A-N) that may be used as an immediate replacement of the original active directory service 120 should an outage of the original directory service occur. In some implementations, the directory service backup system 130 may further include access to the directory service backup database 138 to store information associated with prior iterations of backup and recovery services for each client (e.g., clients associated with each directory service, such as directory service 120 and client device 110).

The standby directory service system 140 illustrates a cloud service provider network that is configured to isolate and store one or more standby directory services 150A-N that are created by the directory service backup system 130. As illustrated, the standby directory service system 140 may include several standby directory services 150A-N (sometimes referred to herein as standby directory service 150). Each standby directory service 150 may include a directory service database 152 and optionally a metadata database 154, and be stored as a conditionally isolated network 156. For example, standby directory service 150A may include a directory service database 152A and a metadata database 154A, stored as a conditionally isolated network 156A, standby directory service 150B may include a directory service database 152B and a metadata database 154B, stored as a conditionally isolated network 156B, and standby directory service 150N may include a directory service database 152N and a metadata database 154N, stored as a conditionally isolated network 156N, and so forth. Alternatively, in some embodiments, the metadata information stored in each metadata database 154 may be stored in files and folders for each associated domain controller for the virtual or cloned standby directory service 150.

In some embodiments of the invention, directory service backup & recovery instruction set 132 may be configured to automatically create and/or recover all necessary directory service components needed to create a working replica standby directory service (e.g., standby directory service 150), collected from the original active directory service (e.g., directory service 120), and optionally stored as a backup(s). The replica standby directory service may also be referred to as a clone system, because each standby directory may be virtually identical ("cloned") as the primary directory (e.g., directory service 120). The standby directory services 150A-N may then be stored into an isolated network (conditionally isolated network 146) or a plethora of isolated networks (conditionally isolated networks 156A-N) which could reside on-premises in the customers network, or stored in a cloud based system on infrastructure provided by an infrastructure as standby directory service system 140 (e.g., Microsoft Azure Active Directory®, Microsoft Active Directory®, Amazon AWS®, and the like).

In some implementations of the invention, the creation or updating a plethora of the isolated standby directory services 150 may be simplified based on a single user interface element (e.g., a backup & recovery button), on-a schedule, programmatically, and/or automatically. For example, automatic recovery may be initiated by the directory service backup & recovery instruction set 132 when an outage of the existing directory service is detected [or when unauthorized access or attempted unauthorized access (e.g. a malware attack) is detected. In some implementations of the invention, multiple standby directory services may be created for redundancy in order to ensure the updating of any one standby directory service 150 does not interfere with an immediate recovery that may be required during the update period. For example, if standby directory service 150A is being updated, standby directory service 150B could be used for recovery.

In some implementations of the invention, the standby directory services 150 may be updated at different times in order to keep the difference in the data between the original primary directory data and the data in one of the standby directory services 150 minimized. For example, if standby directory service 150A last update was on a Monday, and if standby directory service 150B was created on Tuesday, a failover to the standby directory service 150B from Tuesday would have the minimum discrepancy when compared to the original primary directory (e.g., standby directory service 150A last update was on Monday). Additionally, in some implementations of the invention, the standby directory services 150 may be replicated to create an additional standby directory service 150 as another way to control the latency of the data between the primary standby directory service and a given clone standby directory service.

In some implementations of the invention, directory service backup & recovery instruction set 132 may switch from an original directory service (e.g., directory service 120) to one of the one or more standby directory services 150. For example, directory service backup & recovery instruction set 132 may be configured to start-up or shut down servers and services in both the client network of the directory service 120 and a cloud service provider network (e.g., standby directory service system 140) as well as make changes to network configuration on either network so as to reroute user access requests from a client device 110 made to the original directory service 120 to one of the standby directory services 150A-N on the cloud service provider network (e.g., standby directory service system 140). In some implementations, changing the network configuration may involve changing network settings so that a standby directory service 150, which is isolated during initial backup (e.g., isolated network 156), may be made accessible to user access requests.

In some implementations, the directory service backup & recovery instruction set 132 may be configured to configure any number of additional networking or networking device configurations to allow the flow of user access requests to reach either network. For example, if there is a network outage for the network 102, the directory service backup system 130 and the associated standby directory service 150 that was generated to back up the directory service 120 may be hosted and stored on a local computer of the directory service 120, such that the user at the client device 110 may still be able to request a backup & recovery service on site.

Figure 2:
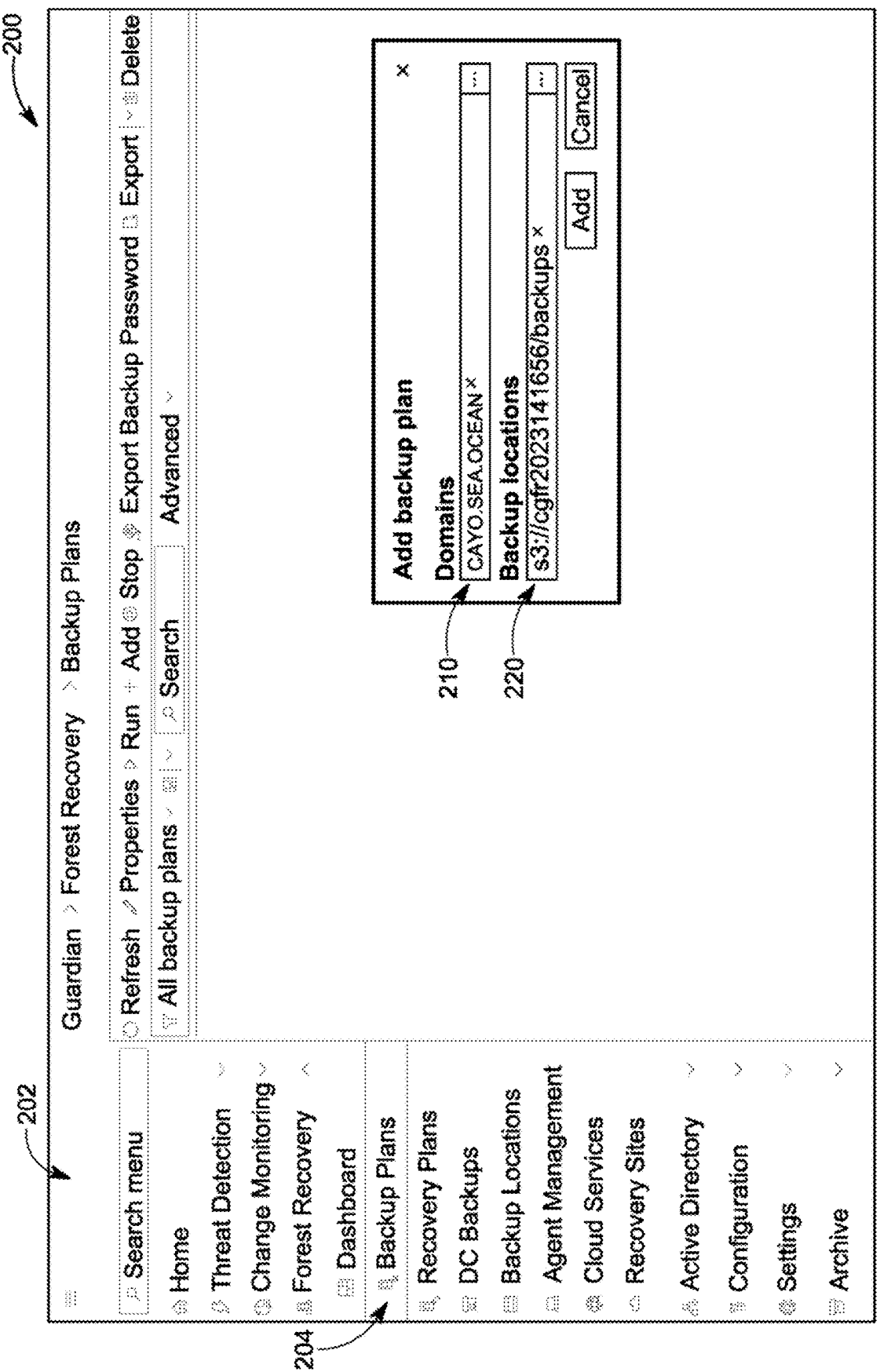
FIG. 2 illustrates an example screenshot of a directory service backup user interface for creating a forest recovery backup plan for a standby directory service, according to embodiments of the invention.

FIG. 2 illustrates an example screenshot 200 of a directory service backup user interface 202 for creating a forest recovery backup plan for a standby directory service, according to embodiments of the invention. In particular, the example screenshot 200 illustrates an example data flow for a user (e.g., an IT administrator) showing a forest recovery and backup plan creation. For example, the directory service backup user interface 202 allows a user to select a backup plan program (element 204) to access a primary directory service settings and computers to be collected and turned into a standby directory. For example, the domain setting (e.g., element 210) allows selecting a source domain to be backed up, and the Backup location setting (e.g., element 210) allows a user to select where backups required to recover directory services will be located. In some implementations, the directory service backup system (e.g., directory service backup system via the directory service backup & recovery instruction set 132) may automatically determine and select the most important domain controllers for the host system (e.g., holding a primary domain controller (PDC) role or acting as a DNS server).

Figure 3:
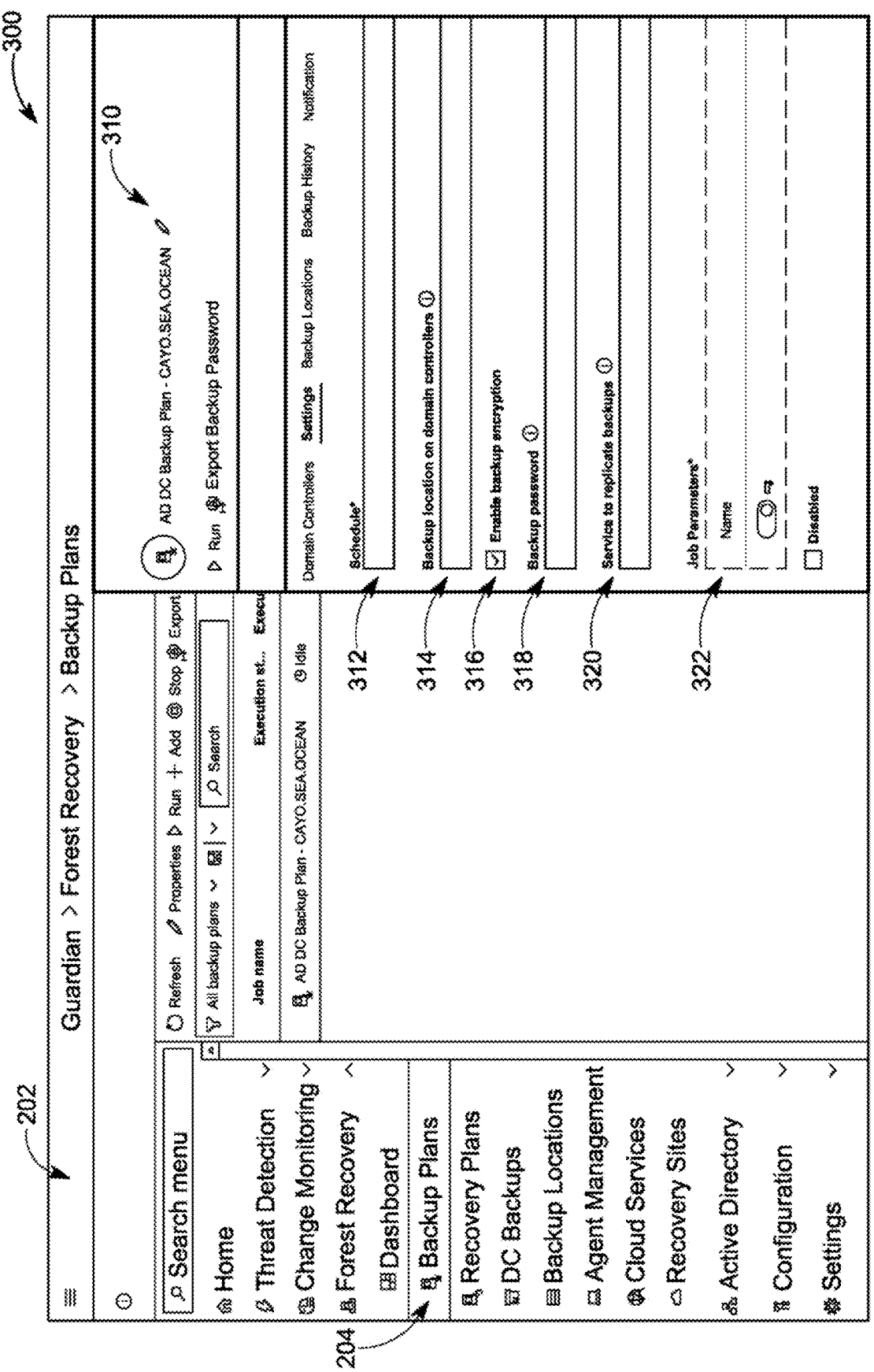
FIG. 3 illustrates an example screenshot of a directory service backup user interface for configuring a forest recovery backup plan for a standby directory service, according to embodiments of the invention.

FIG. 3 illustrates an example screenshot 300 of a directory service backup user interface for configuring a forest recovery backup plan for a standby directory service, according to embodiments of the invention. In particular, the example screenshot 300 illustrates an example data flow for a user (e.g., an IT administrator) for selecting the settings of a potential backup plan in the backup plan window (e.g., window 310) under the selected backup plan program (element 204). The settings under the backup plan window (e.g., window 310) allow the user to setup the service to replicate via replication settings that allow to sync backups to multiple locations. In particular, a user may select and set up a schedule (element 312), select a backup location on the domain controllers (element 314), enable backup encryption function setting to protect backup files at rest (element 316), setup a backup password (element 318), add a service to replicate the backups (element 320), and additional job parameters may be included (element 322).

Figure 4:
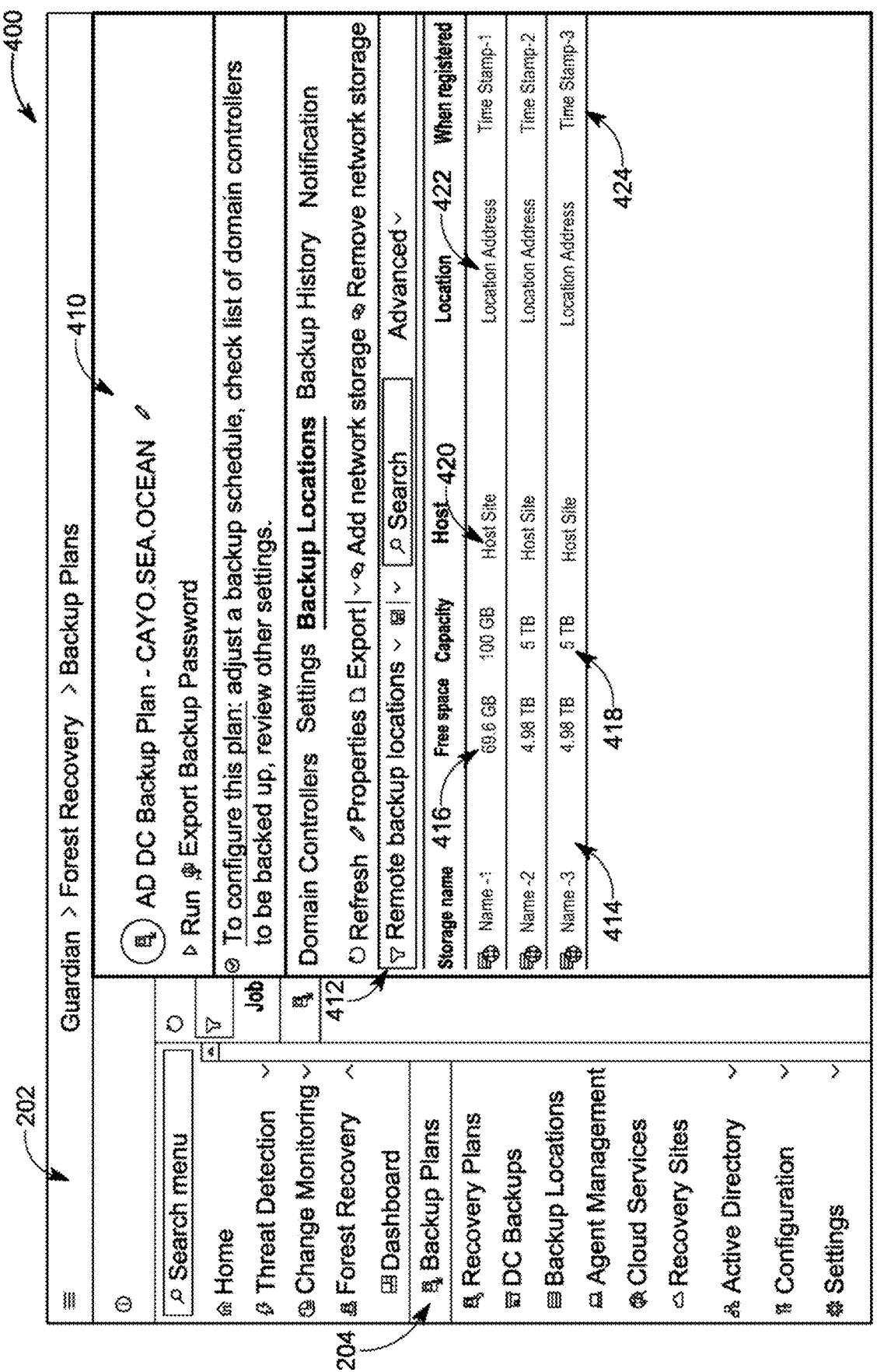
FIG. 4 illustrates an example screenshot of a directory service backup user interface for configuring backup locations for a forest recovery backup plan for a standby directory service, according to embodiments of the invention.

FIG. 4 illustrates an example screenshot 400 of a directory service backup user interface for configuring backup locations for a forest recovery backup plan for a standby directory service, according to embodiments of the invention. In particular, the example screenshot 400 illustrates an example data flow for a user (e.g., an IT administrator) for selecting the settings of a potential backup plan in the backup location window (e.g., window 410) under the backup plan program (element 204). The settings under the selected backup location window (e.g., window 410) show the user where backups are to be stored (e.g., provides a list of storages to keep backups to be used to recover directory service). In particular, a user may view remote backup locations (element 412), view the storage names (element 414), view the amount free space for the each (virtual/isolated) backup location (element 416), view a total capacity for the each (virtual/isolated) backup location (element 418), view the virtual/isolated host service for each backup location (element 420), view the storage location for each backup location (element 422), and view the registered or creation date for each backup location (element 424).

Figure 5:
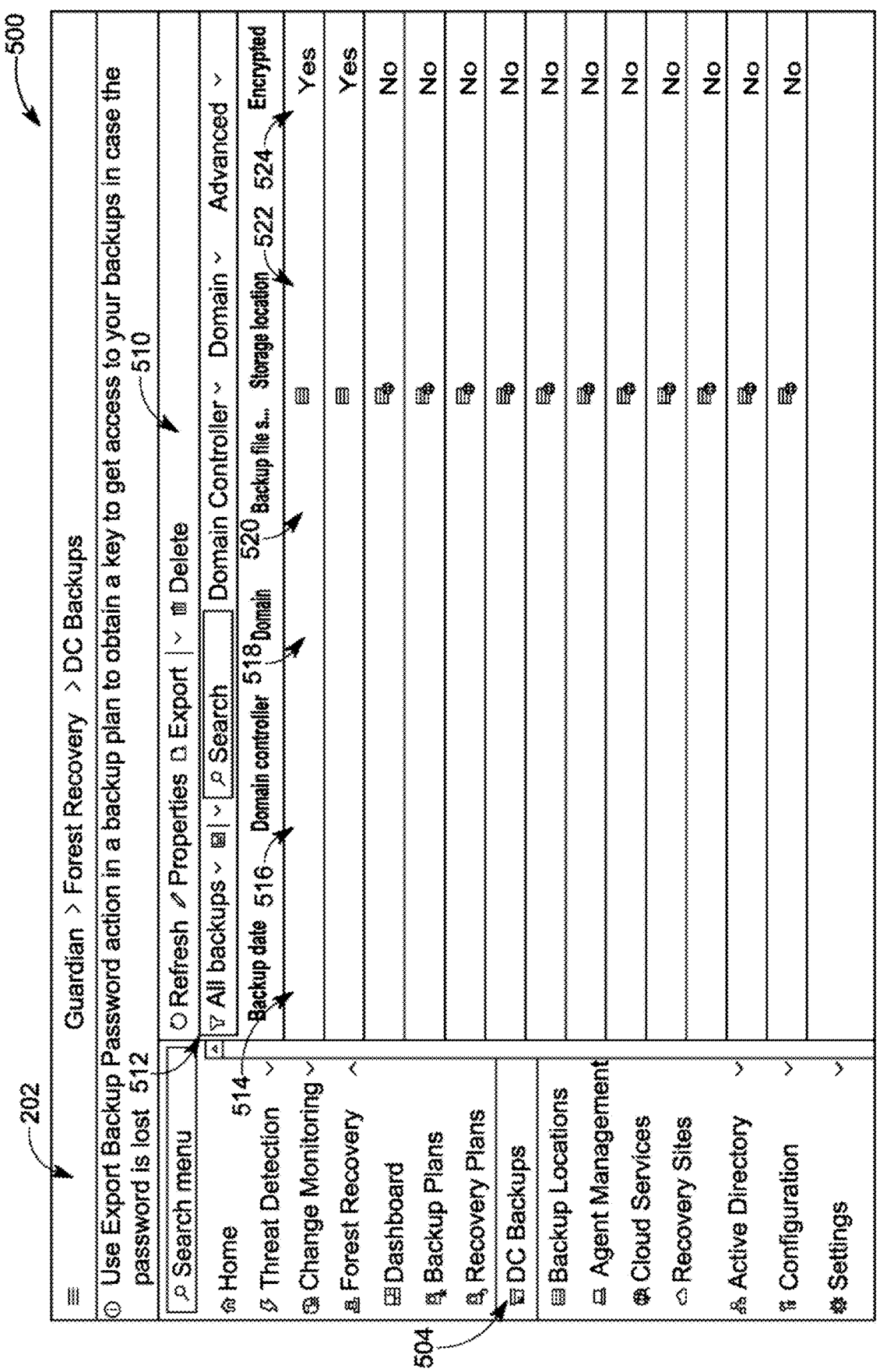
FIG. 5 illustrates an example screenshot of a directory service backup user interface for domain controller backups for a standby directory service, according to embodiments of the invention.

FIG. 5 illustrates an example screenshot 500 of a directory service backup user interface for domain controller backups for a standby directory service, according to embodiments of the invention. In particular, the example screenshot 500 illustrates an example data flow for a user (e.g., an IT administrator) for showing the actual backups of the primary directory service components under the domain controller backup window (e.g., window 510) under the domain controller backup program (element 504). The settings under the selected domain controller backup window (e.g., window 510) show the user where the actual backups of each domain controller are to be stored (e.g., provides a list of storages to keep the domain controller backups to be used to recover directory service). In particular, a user may select to view all of the domain controller backup locations (element 512), view the backup dates (element 514), view the name of each domain controller (element 516), view the name of the domain for each domain controller (element 518), view the backup size for each domain controller backup location (element 520), view the storage location for each domain controller backup location (element 522), and view whether or not each domain controller backup location is encrypted (element 524).

Figure 6:
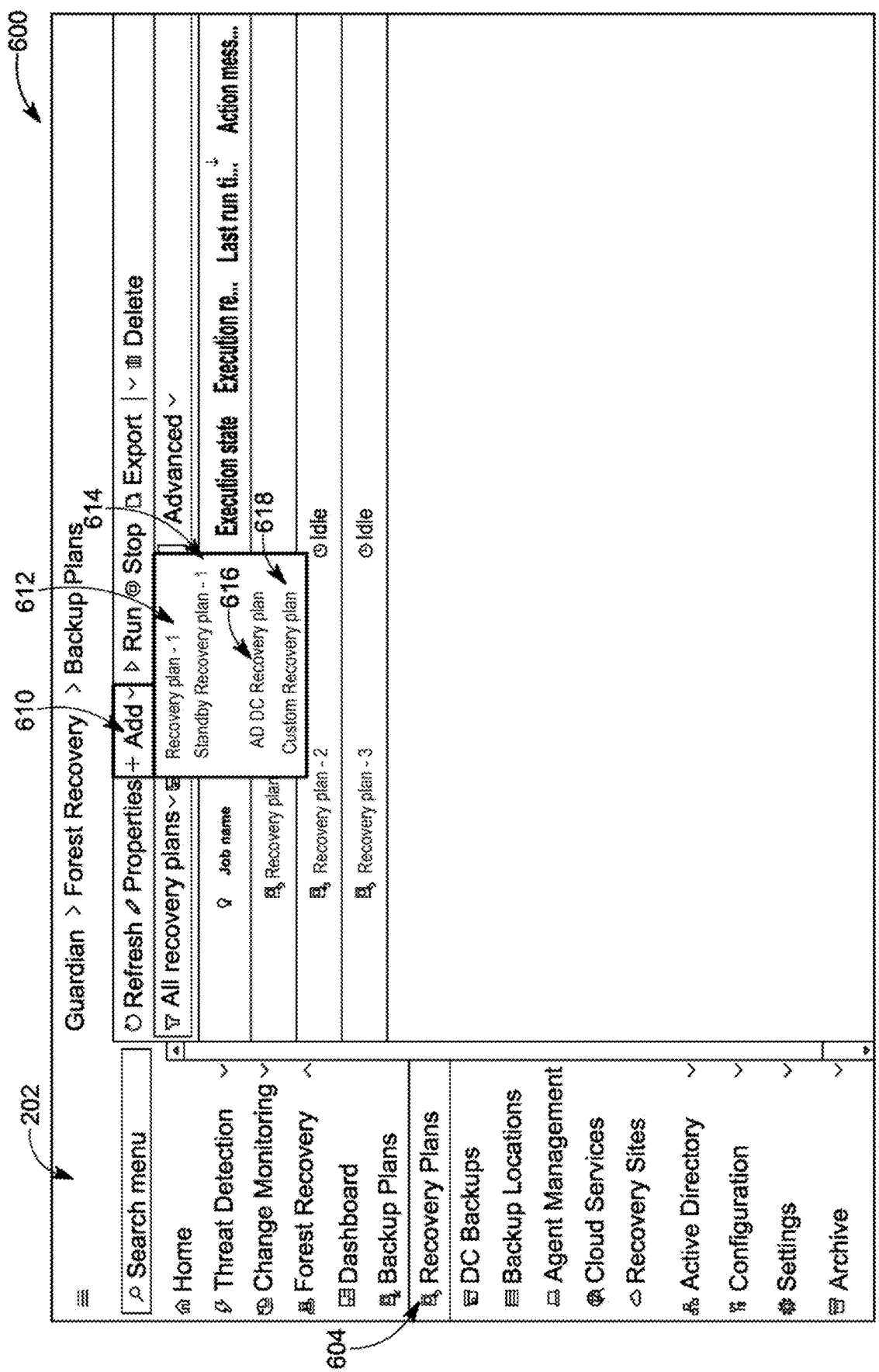
FIG. 6 illustrates an example screenshot of a directory service backup user interface for adding a forest recovery backup plan for a standby directory service, according to embodiments of the invention.

FIG. 6 illustrates an example screenshot 600 of a directory service backup user interface for adding a forest recovery backup plan for a standby directory service, according to embodiments of the invention. In particular, the example screenshot 600 illustrates an example data flow for a user (e.g., an IT administrator) for selecting the settings of a potential recovery plan in the recovery plan window (e.g., window 610) under the selected recovery plan program (element 604). In particular, screenshot 600 illustrates the add function for the recovery plan window (e.g., window 610) for setting up standby directory creation settings. In particular, the settings under the add function of the recovery plan window (e.g., window 610) allow the user to add a forest recovery plan for a manual creation of recovery sites (element 612), add a recovery plan for a standby forest recovery such as an automatic creation of recovery sites by a schedule (element 614), add an active directory domain controller ("AD DC") recovery plan (element 616), and create a custom forest recovery plan (element 618). In some implementations, the AD DC recovery plan (element 616) allows the backup and recovery system to recover a single active directory domain controller rather than having to recover an entire set (e.g., an entire forest).

Figure 7:
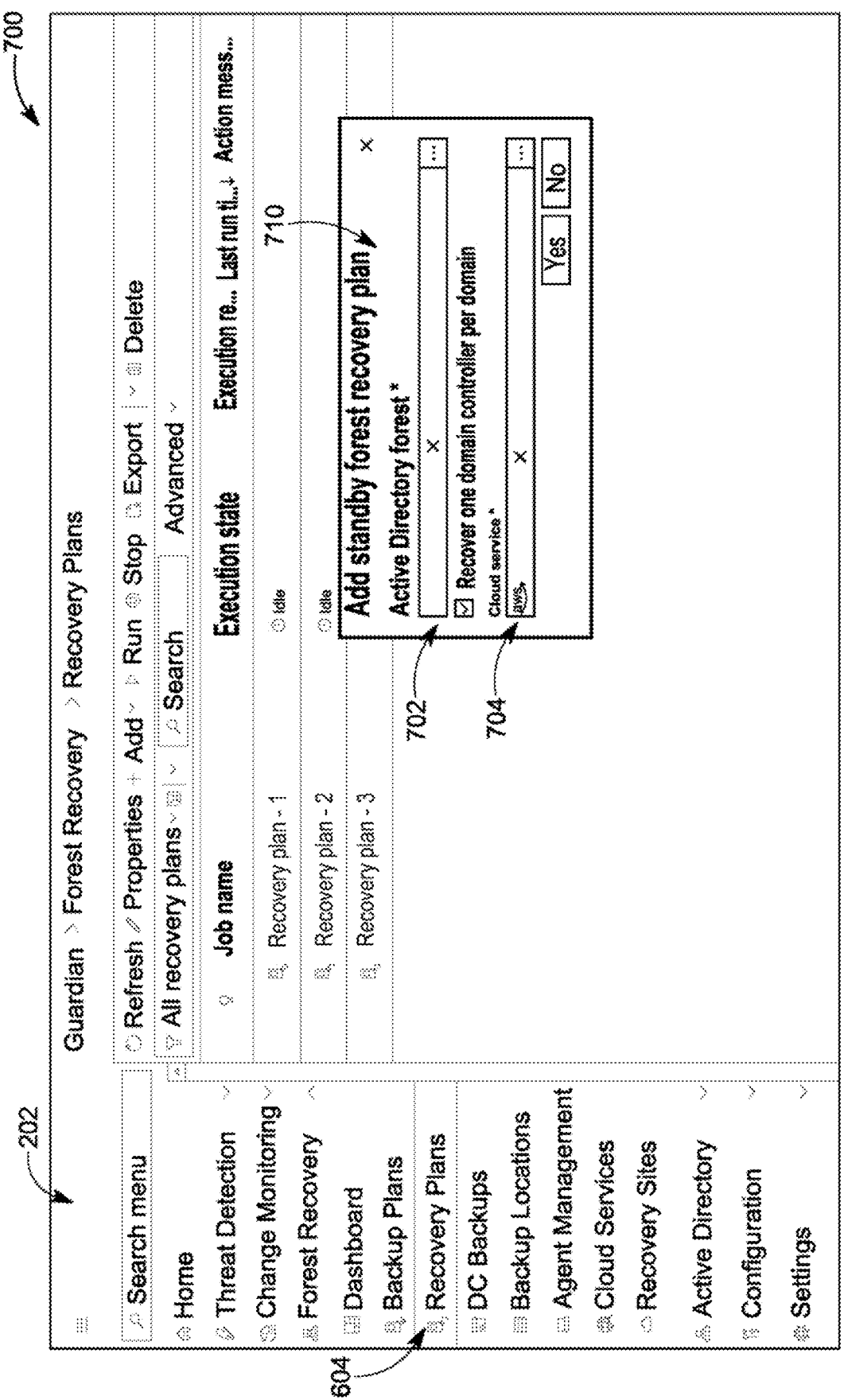
FIG. 7 illustrates an example screenshot of a directory service backup user interface for labeling a forest recovery backup plan for a standby directory service, according to embodiments of the invention.

FIG. 7 illustrates an example screenshot 700 of a directory service backup user interface for labeling a forest recovery backup plan for a standby directory service, according to embodiments of the invention. In particular, the example screenshot 700 illustrates an example data flow for a user (e.g., an IT administrator) for adding a potential recovery plan in the recovery plan window (e.g., window 710) under the selected recovery plan program (element 604). In particular, the settings under the recovery plan window (e.g., window 710) allow the user to select a directory service to be recovered (element 712) and select a cloud service provider as the isolated network provider (element 714). For example, the recovery plan window (e.g., window 710) allows a user to select an active directory forest to be recovered, and to select the cloud service platform and a related account that will be used to deploy virtual machines and other resources required to restore directory services.

Figure 8:
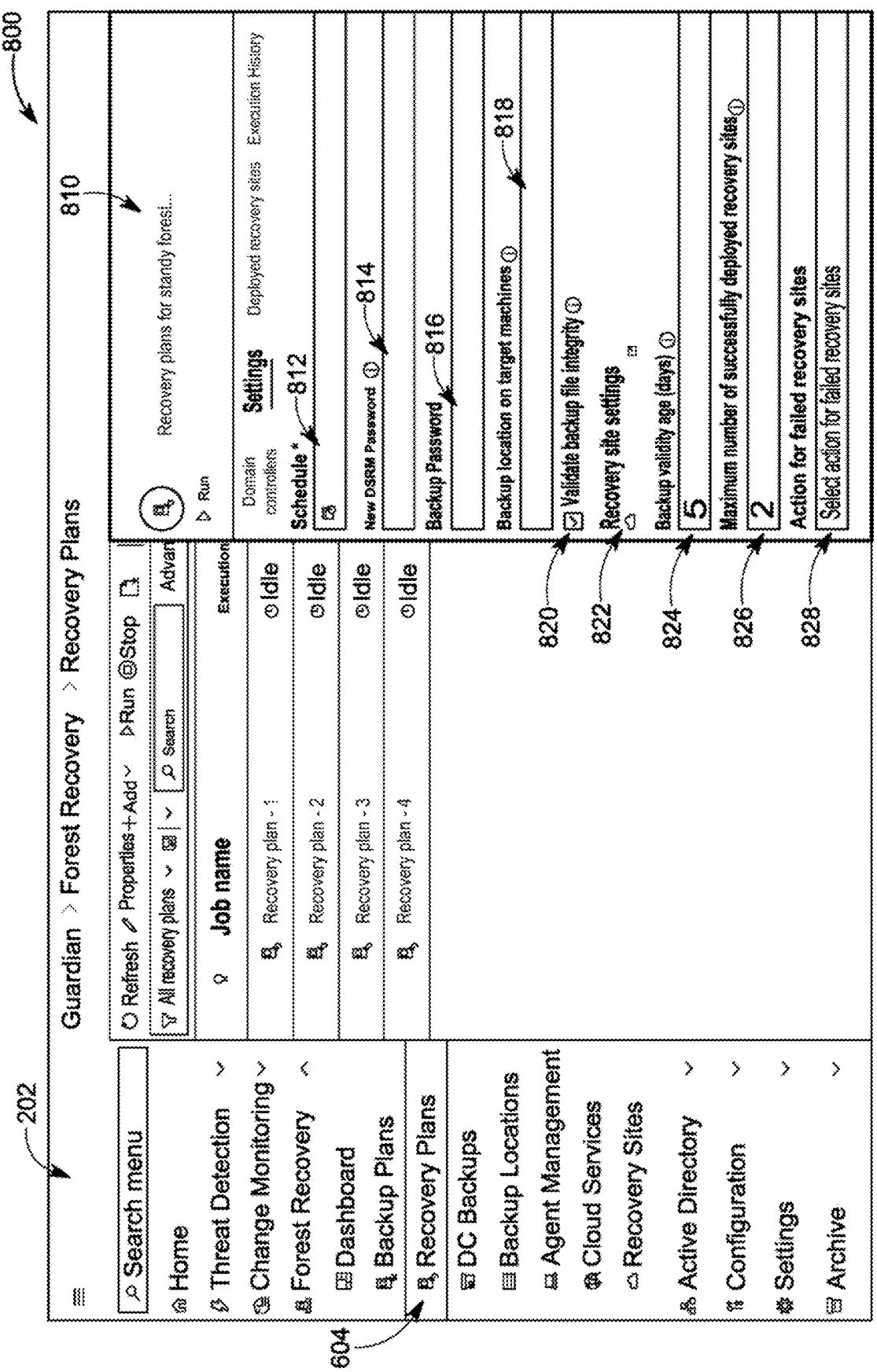
FIG. 8 illustrates an example screenshot of a directory service backup user interface for recovery plan settings for a standby directory service, according to embodiments of the invention.

FIG. 8 illustrates an example screenshot 800 of a directory service backup user interface for recovery plan settings for a standby directory service, according to embodiments of the invention. In particular, the example screenshot 800 illustrates an example data flow for a user (e.g., an IT administrator) for selecting the settings of a potential recovery plan in the recovery plan settings window (e.g., window 810) under the selected recovery plan program (element 604). The settings under the recovery plan settings window (e.g., window 810) allow the user to setup the standby directory creation settings with a scheduling feature that allows creating multiple recovery sites with a scheduled recovery plan. In particular, a user may select and set up a schedule (element 812), select a new directory services restore mode (DSRM) password (element 814), setup a backup password (element 816), select a backup location on the target (isolated) machines (element 818), select whether or not to validate the backup file integrity (element 820), access the recovery site settings (element 822), select a backup validity age (element 824), select a maximum number of successfully deployed recovery sites in order to keep a specified number of recovery sites and delete older sites after successful creation of a new site (element 826), and select an action for failed recovery sites (element 828). In some implementations, based on the backup validity settings, the backup and recovery system may only use backups created within a specified backup validity timeframe (e.g., 5 days).

Figure 9:
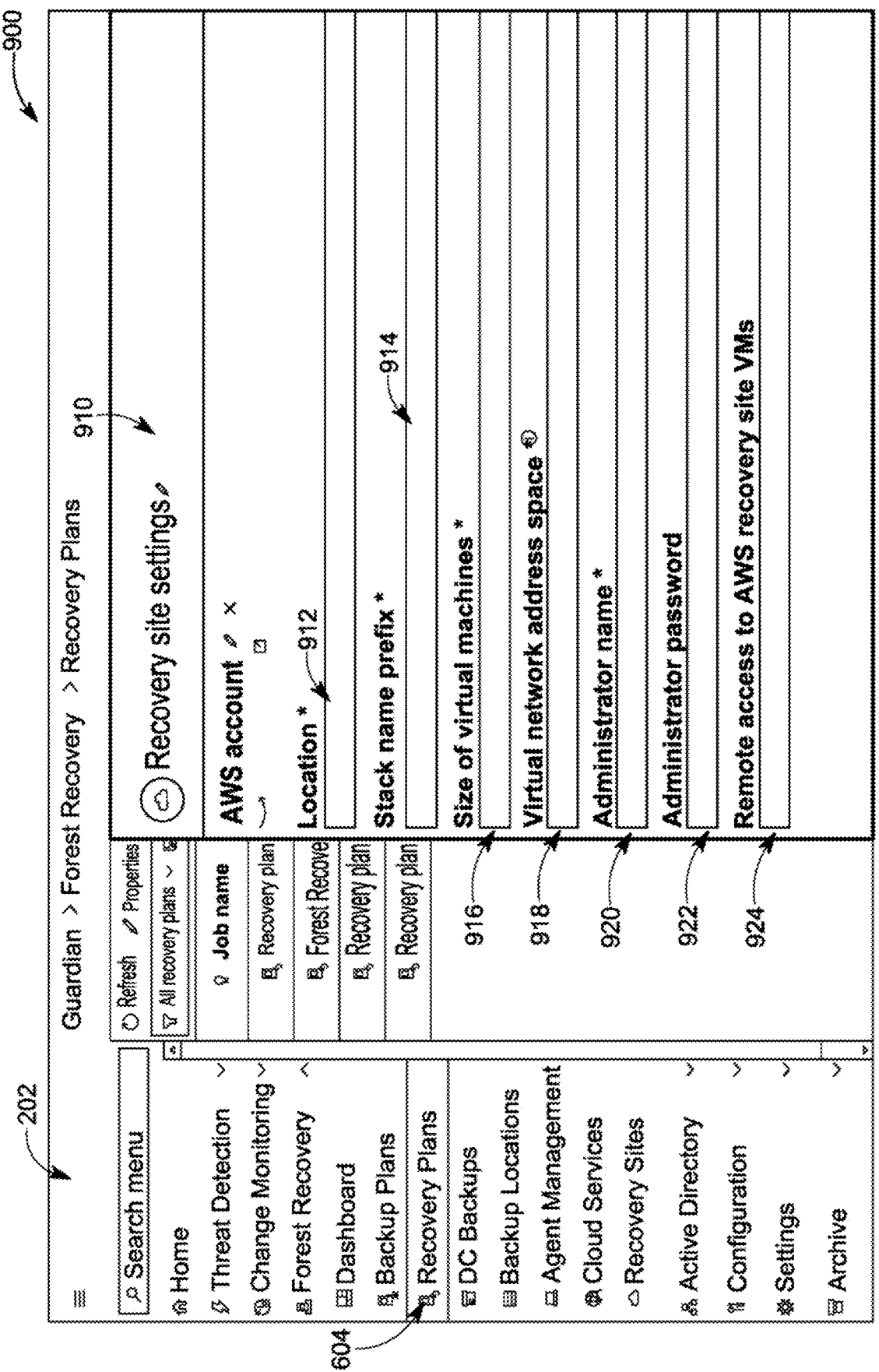
FIG. 9 illustrates an example screenshot of a directory service backup user interface for recovery site settings of an isolated network for a standby directory service, according to embodiments of the invention.

FIG. 9 illustrates an example screenshot 900 of a directory service backup user interface for recovery site settings of an isolated network for a standby directory service, according to embodiments of the invention. In particular, the example screenshot 900 illustrates an example data flow for a user (e.g., an IT administrator) for selecting the settings of a potential recovery plan in the recovery site settings window (e.g., window 910) under the selected recovery plan program (element 604). The settings under the recovery site settings window (e.g., window 910) allow the user to create and/or view location settings of the standby directory and the isolated network (e.g., cloud platform specific settings related to performance and accessibility of the recovered site). In particular, a user may select and set up a location of the recovery site (element 912), select a stack name prefix (element 914), setup a size of the virtual machines (element 916), select a virtual network address space (element 918), select an administrator name (element 920), setup or change an administrator password (element 922), and setup or select a remote access to a cloud provider recovery site to configure a public IP address for each virtual machine location (element 924). In some implementations, the recovery site settings window (e.g., window 910) allows a user to restrict access to a recovered site from the internet.

Figure 10:
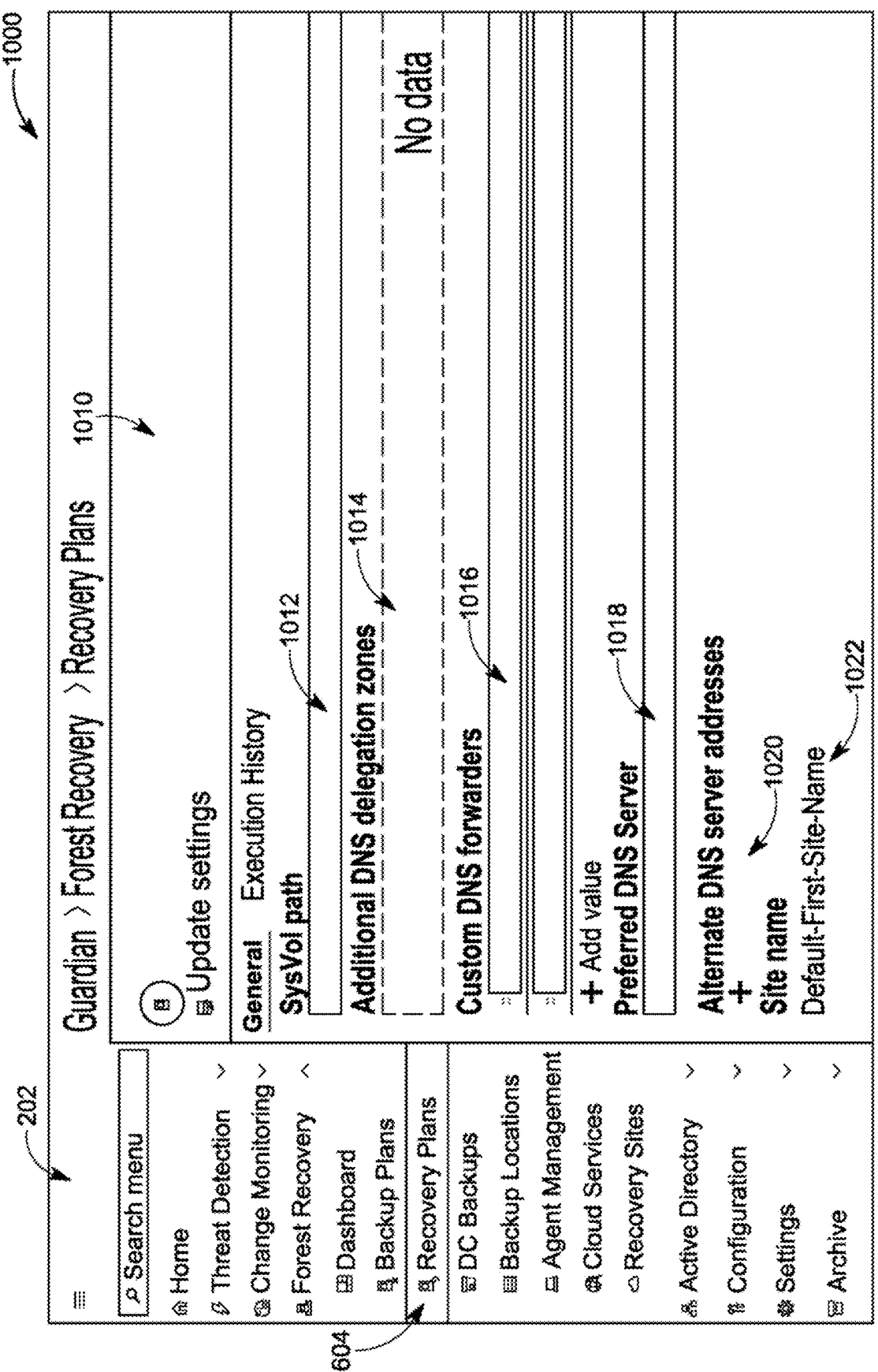
FIG. 10 illustrates an example screenshot of a directory service backup user interface for recovery plan settings for domain controllers for a standby directory service, according to embodiments of the invention.

FIG. 10 illustrates an example screenshot 1000 of a directory service backup user interface for recovery plan settings for domain controllers for a standby directory service, according to embodiments of the invention. In particular, the example screenshot 1000 illustrates an example data flow for a user (e.g., an IT administrator) for viewing the domain controller recovery settings of a potential recovery plan in the domain controller recovery site settings window (e.g., window 1010) under the selected recovery plan program (element 604). The domain controller recovery settings under the domain controller recovery site settings window (e.g., window 1010) allow the user to update and/or view domain controller recovery settings of the standby directory and the isolated network. In particular, a user may select and set up a SysVol location path (element 1012), add additional DNS delegations zones (element 1014), setup custom DNS forwarder locations (element 1016), select or update a preferred DNS server network address (element 1018), add alternate DNS server addresses (element 1020), and view the site name (element 1022).

Figure 11:
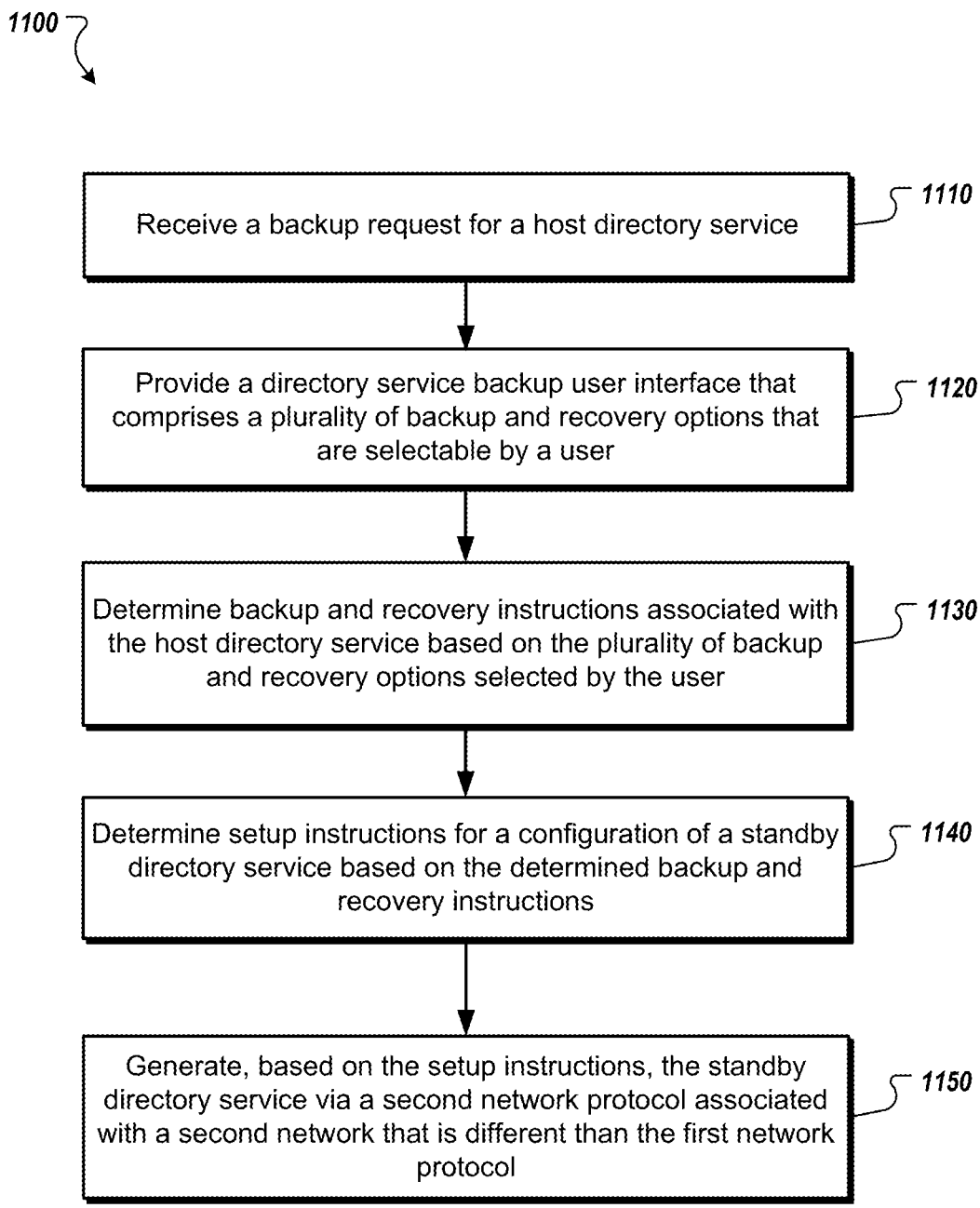
FIG. 11 is a flowchart of an example process for implementing a directory service backup and recovery system, according to embodiments of the invention.

FIG. 11 is a flowchart of an example process 1100 for implementing a directory service backup and recovery system, according to embodiments of the invention. In particular, the operations of process 1100, and options discussed herein, focus on creating a standby directory service on an isolated network from an existing active directory service for the purpose of minimizing the recovery time, complexity, and cost of recovery after an outage of the active directory service (e.g., after a malware attack). Operations of the process 1100 may be implemented, for example, by a system that includes one or more data processing apparatus, such as directory service system 130 of FIG. 1 utilizing a directory service backup & recovery instruction set 132. The process 1100 may also be implemented by instructions stored on computer storage medium, where execution of the instructions by a system that includes a data processing apparatus cause the data processing apparatus to perform the operations of the process 1100.

The backup and recovery device receives a backup request for a host directory service (1110). For example, a client device (e.g., client device 110 via application 112) sends a backup and/or recovery request to the directory service backup system 130. The client device, host directory service, and the directory service backup device are communicatively coupled via a first network protocol associated with a first network (e.g., universal internet or other client/private IP network such as a VPN). In some implementations, the backup and recovery system (e.g., directory service backup system 120) is cloud-based software (e.g., directory service backup & recovery instruction set 132) implemented on a remote server or implemented on a computer at the host site of the directory service (e.g., locally installed). In some implementations, the backup request for the host directory service is automatically initiated based on a predetermined schedule.

The backup and recovery system provides a directory service backup user interface that includes a plurality of backup and recovery options that are selectable by a user (1120). For example, as illustrated in FIGS. 2-10, a directory service backup user interface 202 provides options/settings for the client to select a backup schedule (daily/nightly, weekly, etc.), replication settings, passwords, selecting which domain controllers and metadata to backup, creation of recovery sites, cloud service provider and settings (isolated network, remote access), domain controller recovery settings, and like.

The backup and recovery system determines backup and recovery instructions associated with the host directory service based on the plurality of backup and recovery options selected by the user (1130). For example, as illustrated in screenshot 800 of FIG. 8, a directory service backup user interface 202 provides options that a user/client may select for a recovery plan. In some implementations, the plurality of backup and recovery options includes at least one of a scheduling feature, a file integrity validation feature, target machine location settings, and recovery site options, and backup encryption features.

In some implementations, the backup and recovery instructions associated with the host directory service are associated with at least one domain controller of the set of domain controllers (e.g., create working directory service using backups of original directory service for one of the domain controllers).

The backup and recovery system determines setup instructions for a configuration of a standby directory service based on the determined backup and recovery instructions (1140). For example, as illustrated in screenshot 800 of FIG. 8, a directory service backup user interface 202 provides the details for the created standby directory for selecting and initiating a backup and recovery plan via a standby directory service 150.

In some implementations, the setup instructions for initiating the standby directory service are configured to restore only directory service attributes. For example, the backups for the standby directory service 150 may not contain executables or other files that can be infected, so even if malware exists on the source domain controller, a recovered domain controller would not contain malware (e.g., only contain directory data and metadata, not operating system data where malware may exist).

In some implementations, the setup instructions for initiating the standby directory service are configured to restore the set of domain controllers based on a last iterative update. In some implementations, restoring the set of domain controllers includes updating an internet protocol address (e.g., point router/firewall from an internal network environment to the clone network).

The backup and recovery system generates, based on the setup instructions, the standby directory service via a second network protocol associated with a second network that is different than the first network protocol (1150). For example, a standby directory service 150A (e.g., a virtual machine on an isolated network) may be generated to back up the directory service 120. In some implementations, the second network is an isolated recovery environment. In some implementations, the backups of the standby directory service (unlike bare-metal backups or others) may only contain directory service data, and may not contain executables or other files that may be infected by a malware event, so even if malware existed on the source domain controller, a recovered domain controller would not contain malware (e.g., only contain directory data and metadata, not operating system data where malware may exist).

In some implementations, the standby directory service is automatically updated based on a schedule selected from the plurality of backup and recovery options at the client device. For example, as illustrated in screenshot 300 in FIG. 3, a client/user (e.g., an IT administrator) may select a recovery plan for a standby forest with a setting for an automatic creation of recovery sites by a set schedule (e.g., element 312). In some implementations, the setup instructions for initiating the standby directory service are configured to automatically modify network settings associated with the host directory service to use the standby directory service in place of the host directory service. For example, automated modification of the settings of the network infrastructure and computers using the host directory service may be performed in order to force clients to use a cloned directory service instead of the original one, point router/firewall from the standby (isolated) environment, and change routing to that clone network (e.g., standby directory service 150).

In some implementations, the process 1100 further includes detecting interruption event (e.g., a malware event, or detecting irreversible changes of schema or massive irreversible changes of objects, detecting a natural disaster, etc.) at the host directory service and in response to detecting an interruption event, implementing a standby directory service for the host directory service that is impacted by the interruption event. For example, there are generally two types of disasters for a directory service: logical and physical. A logical disaster is when all domain controllers are alive, but schema is broken or there is other issue with active directory objects. A physical disaster is when domain controllers are down (e.g., physically destroyed or encrypted). In both cases, the active directory (e.g., AD Forest) may not be operational, and not just specific domain controllers. Therefore, the backup and recovery is configured to restore the entire active directory (e.g., AD Forest). Additionally, a recovery site (e.g., standby directory service system 140) may provide directory services like authentication and authorization for the recovered directory service. In some implementations, determining that the interruption event has occurred at the host directory service in order to implement the standby directory service is based on determining irreversible changes of schema occurred at the host directory service, determining a number of irreversible changes of objects at the host directory service exceeded a threshold, determining that a natural disaster occurred at a location of the host directory service.

In some implementations, the host directory service may include a set of domain controllers and metadata corresponding to network infrastructure and additional services associated with the host directory service. For example, a host directory service requires additional services in order to function, such as network infrastructure, DNS, etc. Metadata may refer to additional information about these additional services such as IP addresses, DNS configuration, and the like that is required to rebuild DNS and network infrastructure in the standby directory service (e.g., cloned directory) including network switches, DNS servers and other required devices. In some implementations, implementing the standby directory service for the host directory service includes recovering directory data and the metadata corresponding to network infrastructure based on the determined backup and recovery instructions.

Alternatively, or additionally, in some implementations, detecting a malware event at the host directory service includes determining that a first domain controller of the set of domain controllers of the host directory service is impacted by the malware event, and wherein implementing the standby directory service includes utilizing a first standby domain controller associated with the first domain controller of the host directory service that is impacted by the malware event. For example, updating a router to use an IP address of a set of domain controllers at the standby directory service 150 instead of the associated domain controllers at the host directory service 120. For example, an IT administrator may go to their router and instead of having login traffic routed to the internal network, they may route it across the external network up to the isolated recovery network (e.g., standby directory service system 140), and the recovery network that was created night before (e.g., the clone directory service) may be utilized.

In some implementations, the process 1100 may further include, in response to implementing the standby directory service for the host directory service, iteratively (e.g., continuously or on predetermined schedule) performing a standby event process (e.g., post malware event algorithm). For example, in response to detecting a malicious attack at the host service 120, or another event that causes issues to the directory service, the backup and recovery system may perform additional steps in the restored environment after the initial restore and after each update. For example, the directory service backup & recovery instruction set 132 may be configured to install additional software at the directory service 120 host site and/or the standby directory service system 140, check for any additional potential threats, check for data and service consistency, send notifications, run a script or external application, and the like.

In some implementations, the backup request for the host directory service is automatically initiated based on detected changes of objects associated with the host directory service. For example, the host directory service might be synced to a clone directory service after a specific event like changes of active directory objects.

In some implementations, the standby directory service includes a virtual machine or a set of virtual machines and corresponding network infrastructure elements, and the corresponding network infrastructure elements may include at least one of network switches, storages, and firewalls.

In some implementations, the process 1100 may further include determining that a portion of directory service data was removed (e.g., malware, user error, hardware issues, etc.) for a particular account, implementing the standby directory service for the host directory service, identifying the portion of directory service data that was removed, and updating the standby directory service based on the identified portion of directory service data. For example, all change history to a directory service may be captured. Thus, if a hacker removes a portion of the data, a backup and recovery may be performed to remove a particular account (e.g., shut down all domain controllers, and now using a prerecovered "safe" environment of the standby directory service system 140 via an isolated network). The backup and recovery system can then compare the affected data from the directory service 120 to the backup data and capture all change history. As the system identifies the changed data, the active directory may be immediately recorded. For example, if there are 1000 people in a phone directory, and 100 people are deleted, based on the capturing change history, the backup and recovery system may identify the 100 people that were removed from prior recovery, may then add them back (e.g., look at all the data that was changed, and update the clone of the active directory environment).

In some implementations, determining that the interruption event has occurred at the host directory service in order to implement the standby directory service is based on determining irreversible changes of schema occurred at the host directory service, determining a number of irreversible changes of objects at the host directory service exceeded a threshold, or determining that a natural disaster occurred at a location of the host directory service. For example, some embodiments of the invention relate to switching to a clone directory (including clone creation) in case of critical failure of logical structure (schema changes, massive changes of objects) or in case of critical failure of physical infrastructure like all domain controllers are infected/not operational. An original directory can be replaced with a clone that has fewer domain controllers (e.g., in a cloned directory service, a directory service may need at least one domain controller for each domain in the active directory forest.), but it is not feasible to replace individual domain controllers in host directory with individual domain controllers in the cloned directory. Typically, if there is a disaster that requires restoring of the whole forest (e.g., in this case switching to a clone), it means that a directory service as a whole should be restored and/or replaced.

Figure 12:
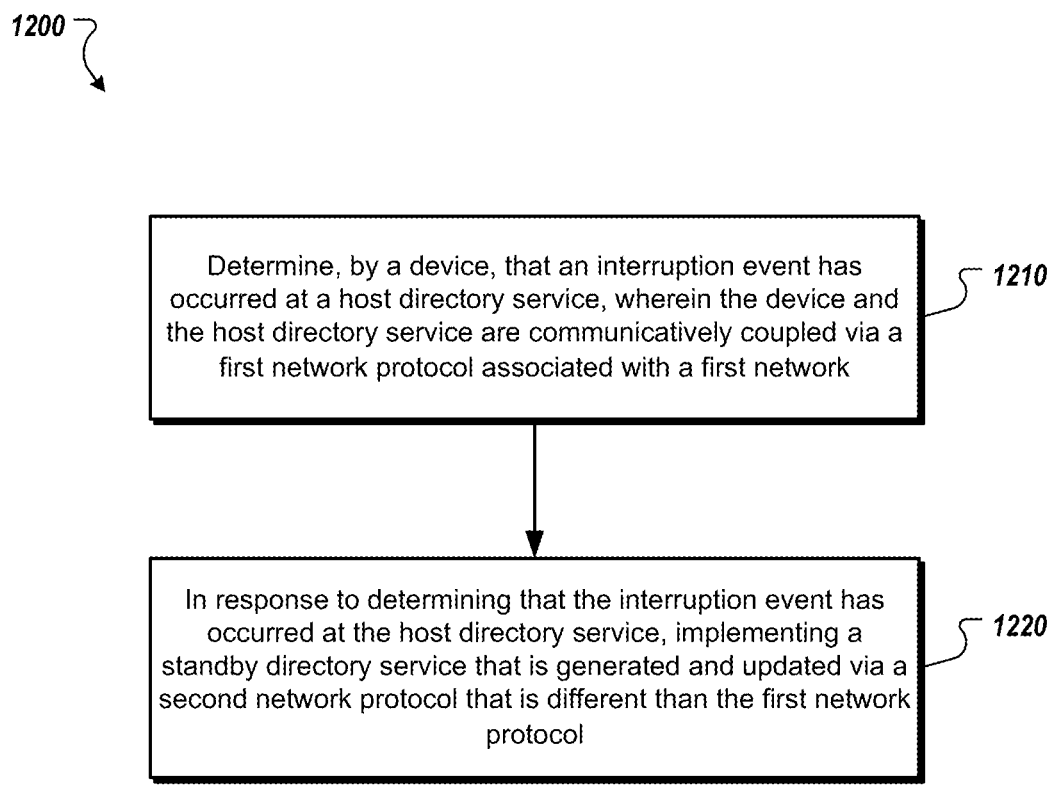
FIG. 12 is a flowchart of an example process for implementing a directory service backup and recovery system, according to embodiments of the invention.

FIG. 12 is a flowchart of an example process 1200 for implementing a directory service backup and recovery system, according to embodiments of the invention. In particular, the operations of process 1200, and options discussed herein, focus on implementing a standby directory service that was generated and updated on an isolated network for an existing active directory service for the purpose of minimizing the recovery time, complexity, and cost of recovery after an outage of the active directory service (e.g., after a malware attack). Operations of the process 1200 may be implemented, for example, by a system that includes one or more data processing apparatus, such as directory service system 130 of FIG. 1 utilizing a directory service backup & recovery instruction set 132. The process 1200 may also be implemented by instructions stored on computer storage medium, where execution of the instructions by a system that includes a data processing apparatus cause the data processing apparatus to perform the operations of the process 1200.

A device determines that an interruption event has occurred at a host directory service, wherein the device and the host directory service are communicatively coupled via a first network protocol associated with a first network (1210). For example, the directory service backup & recovery instruction set 132, which may be hosted locally at the directory service 120 or remotely accessed at another location (e.g., cloud based, such as located at the directory service backup system 130), may detect a malware event and initiate a backup and recovery process (e.g., replace a directory service domain controller with a cloned directory service domain controller). Additionally, or alternatively, determining that an interruption event has occurred at the host directory service may be based on a receiving a recovery request from the host site. For example, an IT administrator may request to pull in the data from the backup directory service because of a suspected malware attack, or due to a hardware issue, or a desire to test software in a cloned directory service environment that is isolated.

In response to determining that the interruption event has occurred at the host directory service, the device implements a standby directory service that is generated and updated via a second network protocol that is different than the first network protocol (1220). In some implementations, the second network includes an isolated recovery environment that is separated from the first network. For example, the backup and recovery system may detect an interruption event (e.g., a malware event, or detecting irreversible changes of schema or massive irreversible changes of objects, detecting a natural disaster, etc.) at the host directory service and in response to detecting an interruption event, implementing a standby directory service for the host directory service that is impacted by the interruption event. For example, there are generally two types of disasters for a directory service: logical and physical. A logical disaster is when all domain controllers are alive, but schema is broken or there is other issue with active directory objects. A physical disaster is when domain controllers are down (e.g., physically destroyed or encrypted). In both cases, the active directory (e.g., AD Forest) may not be operational, and not just specific domain controllers. Therefore, the backup and recovery is configured to restore the entire active directory (e.g., AD Forest). Additionally, a recovery site (e.g., standby directory service system 140) may provide directory services like authentication and authorization for the recovered directory service. In some implementations, determining that the interruption event has occurred at the host directory service in order to implement the standby directory service is based on determining irreversible changes of schema occurred at the host directory service, determining a number of irreversible changes of objects at the host directory service exceeded a threshold, determining that a natural disaster occurred at a location of the host directory service.

In some implementations, the standby directory service includes a virtual machine or a set of virtual machines and corresponding network infrastructure elements, and the corresponding network infrastructure elements may include at least one of network switches, storages, and firewalls.

In some implementations, in response to implementing the standby directory service for the host directory service, the process 1200 further includes, iteratively performing a standby event process for a restored network environment associated with the standby directory service. In some implementations, the standby event process includes at least one of installing additional backup and recovery software, performing a potential threat analysis on the first network, performing a data and service consistency check, and sending a notification to a client device.

In some implementations, the interruption event is determined based on detecting changes of one or more objects associated with the host directory service. For example, that host directory service might be synced to a clone directory service after a specific event like detected changes of active directory objects.

In some implementations, the host directory service may include a set of domain controllers and metadata corresponding to network infrastructure and additional services associated with the host directory service. In some implementations, implementing the standby directory service for the host directory service includes recovering directory data and the metadata corresponding to each domain controller based on the determined backup and recovery instructions. For example, a host directory service requires additional services in order to function, such as network infrastructure, DNS, etc. Metadata may refer to additional information about these additional services such as IP addresses, DNS configuration, and the like that is required to rebuild DNS and network infrastructure in the standby directory service (e.g., cloned directory) including network switches, DNS servers and other required devices. In some implementations, implementing the standby directory service for the host directory service includes recovering directory data and the metadata corresponding to network infrastructure based on the determined backup and recovery instructions.

Figure 13:
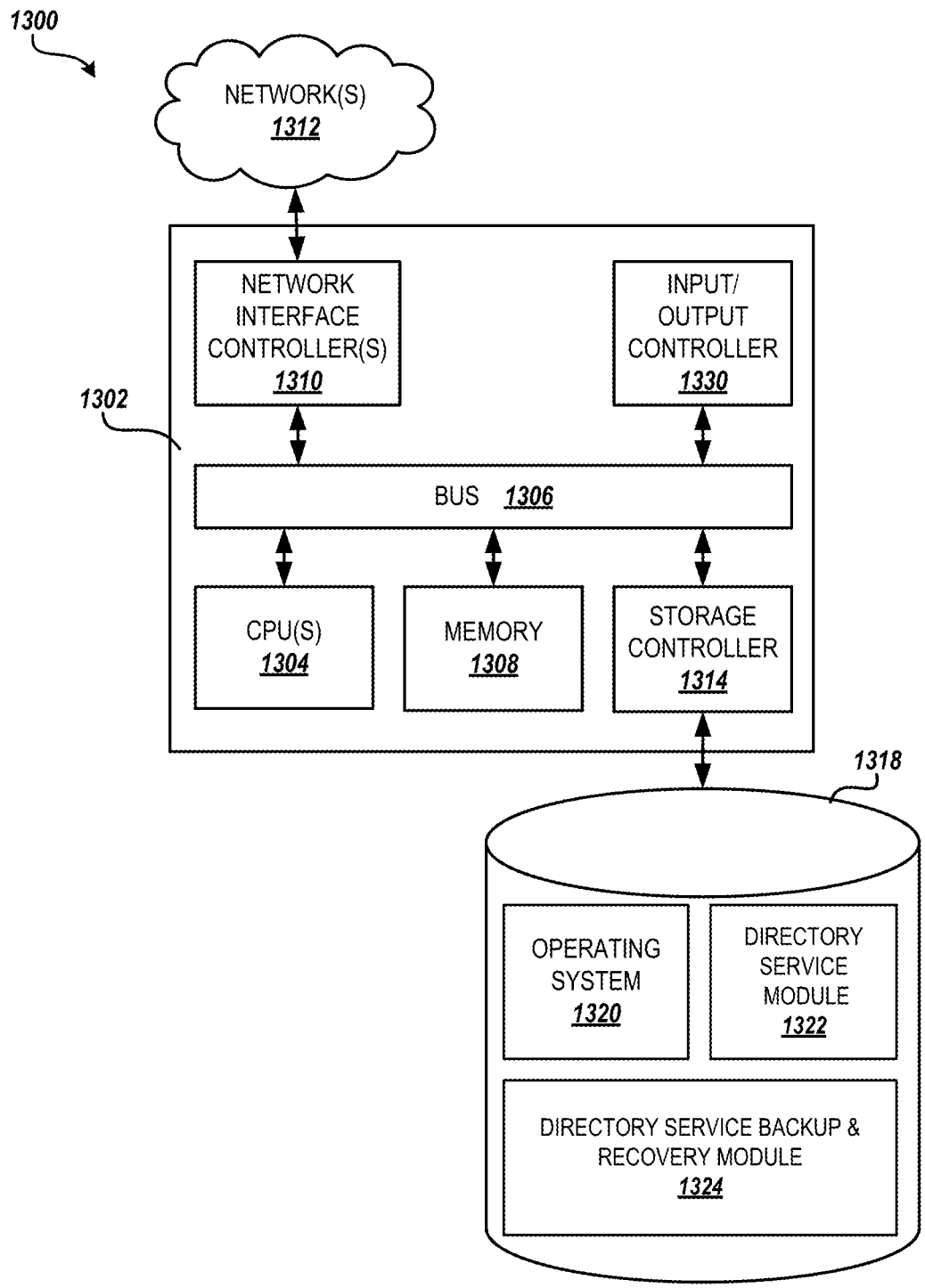
FIG. 13 is a block diagram showing an example computer architecture for a computer capable of executing the software components described herein, according to embodiments described herein.

FIG. 13 illustrates an example computer architecture 1300 for a computer 1302 capable of executing the software components described herein for the sending/receiving and processing of tasks. The computer architecture 1300 (also referred to herein as a "server") shown in FIG. 13 illustrates a server computer, workstation, desktop computer, laptop, a server operating in a cloud environment, or other computing device, and may be utilized to execute any aspects of the software components presented herein described as executing on a host server, or other computing platform. The computer 1302 preferably includes a baseboard, or "motherboard," which is a printed circuit board to which a multitude of components or devices may be connected by way of a system bus or other electrical communication paths. In one illustrative embodiment, one or more central processing units (CPUs) 1304 operate in conjunction with a bus 1306. The CPUs 1304 may be programmable processors that perform arithmetic and logical operations necessary for the operation of the computer 1302.

The CPUs 1304 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The bus 1306 provides an interface between the CPUs 1304 and the remainder of the components and devices on the baseboard. The bus 1306 may provide an interface to a memory 1308. The memory 1308 may include a random-access memory (RAM) used as the main memory in the computer 1302. The memory 1308 may further include a computer-readable storage medium such as a read-only memory (ROM) or non-volatile RAM (NVRAM) for storing basic routines that that help to startup the computer 1302 and to transfer information between the various components and devices. The ROM or NVRAM may also store other software components necessary for the operation of the computer 1302 in accordance with the embodiments described herein.

According to various embodiments, the computer 1302 may operate in a networked environment using logical connections to remote computing devices through one or more networks 1312, a local-area network (LAN), a wide-area network (WAN), the Internet, or any other networking topology known in the art that connects the computer 1302 to the devices and other remote computers. The bus 1306 includes functionality for providing network connectivity through one or more network interface controllers (NICs) 1310, such as a gigabit Ethernet adapter. For example, the NIC 1310 may be capable of connecting the computer 1302 to other computer devices in the utility provider's systems. It should be appreciated that any number of NICs 1310 may be present in the computer 1302, connecting the computer to other types of networks and remote computer systems beyond those described herein.

The computer 1302 may be connected to at least one mass storage device 1318 that provides non-volatile storage for the computer 1302. The mass storage device 1318 may store system programs, application programs, other program modules, and data, which are described in greater detail herein. The mass storage device 1318 may be connected to the computer 1302 through a storage controller 1314 connected to the bus 1306. The mass storage device 1318 may consist of one or more physical storage units. The storage controller 1314 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 1302 may store data on the mass storage device 1318 by transforming the physical state of the physical storage units to reflect the information being stored. The specific transformation of physical state may depend on various factors, in different embodiments of the invention of this description. Examples of such factors may include, but are not limited to, the technology used to implement the physical storage units, whether the mass storage device 1318 is characterized as primary or secondary storage, or the like. For example, the computer 1302 may store information to the mass storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1302 may further read information from the mass storage device 1318 by detecting the physical states or characteristics of one or more particular locations within the physical storage units.

The mass storage device 1318 may store an operating system 1320 utilized to control the operation of the computer 1302. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 1318 may store other system or application programs and data utilized by the computer 1302, such as directory service module 1322 to orchestrate the directory service process, and a directory service backup and recovery module 1324 for orchestrating the backup and recovery of a directory service, according to embodiments described herein. Other system or application programs and data utilized by the computer 1302 may be provided as well (e.g., a payment processing module, a security module, a user interface module, etc.).

In some embodiments, the mass storage device 1318 may be encoded with computer-executable instructions that, when loaded into the computer 1302, transforms the computer 1302 from being a general-purpose computing system into a special-purpose computer capable of implementing the embodiments described herein. These computer-executable instructions transform the computer 1302 by specifying how the CPUs 1304 transition between states, as described above. According to some embodiments, from the directory service 120 perspective, the mass storage device 1318 stores computer-executable instructions that, when executed by the computer 1302, perform portions of the process 1100, for implementing a simulation system, as described herein. In further embodiments, the computer 1302 may have access to other computer-readable storage medium in addition to or as an alternative to the mass storage device 1318.

The computer 1302 may also include an input/output controller 1330 for receiving and processing input from a number of input devices, such as a keyboard, a mouse, a touchpad, a touch screen, an electronic stylus, or other type of input device. Similarly, the input/output controller 1330 may provide output to a display device, such as a computer monitor, a flat-panel display, a digital projector, a printer, a plotter, or other type of output device. It will be appreciated that the computer 1302 may not include all of the components shown in FIG. 13, may include other components that are not explicitly shown in FIG. 13, or may utilize an architecture completely different than that shown in FIG. 13.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that may be used to store the desired information and which may be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computer-implemented method comprising:
   at a directory service backup device comprising one or more processors:
   receiving, from a client device, a backup request for a host directory service, wherein the client device, the host directory service, and the directory service backup device are communicatively coupled via a first network protocol associated with a first network;
   providing, for display at the client device, a directory service backup user interface that comprises a plurality of backup and recovery options that are selectable by a user;
   determining backup and recovery instructions associated with the host directory service based on the plurality of backup and recovery options selected by the user;
   determining setup instructions for a configuration of a standby directory service within an isolated virtual machine environment based on the determined backup and recovery instructions, wherein the standby directory service comprises a virtual machine or a set of virtual machines and corresponding network infrastructure elements associated with the isolated virtual machine environment; and
   iteratively generating, based on the setup instructions, the standby directory service within the isolated virtual machine environment via a second network protocol associated with a second network that is different than and isolated from the first network protocol, wherein each iteration of generating the standby directory service replaces a previous iteration of the standby directory service.

2. The method of claim 1, further comprising:
   detecting an interruption event at the host directory service; and in response to detecting the interruption event, implementing the standby directory service for the host directory service.

3. The method of claim 2, wherein determining that the interruption event has occurred is based on at least one of:
determining irreversible changes of schema occurred at the host directory service;
determining a number of irreversible changes of objects at the host directory service exceeded a threshold; or
determining that a natural disaster occurred at a location of the host directory service.

4. The method of claim 2, further comprising:
in response to implementing the standby directory service for the host directory service, iteratively performing a standby event process.

5. The method of claim 1, wherein the host directory service comprises a set of domain controllers and metadata corresponding to network infrastructure and additional services associated with the host directory service.

6. The method of claim 5, wherein implementing the standby directory service for the host directory service comprises recovering directory data and the metadata corresponding to network infrastructure based on the determined backup and recovery instructions.

7. The method of claim 1, wherein the second network comprises an isolated recovery environment that is separated from the first network.

8. The method of claim 1, wherein the standby directory service is automatically updated based on a schedule selected from the plurality of backup and recovery options at the client device.

9. The method of claim 1, wherein the plurality of backup and recovery options comprises at least one of a scheduling feature, a file integrity validation feature, target machine location settings, recovery site options, and backup encryption features.

10. The method of claim 1, wherein the setup instructions for initiating the standby directory service are configured to automatically modify network settings associated with the host directory service to use the standby directory service in place of the host directory service.

11. The method of claim 1, wherein the backup request for the host directory service is automatically initiated based on a predetermined schedule.

12. The method of claim 1, wherein the backup request for the host directory service is automatically initiated based on detected changes of objects associated with the host directory service.

13. The method of claim 1, wherein the corresponding network infrastructure elements of the standby directory service comprises at least one of network switches, storages, and firewalls.

14. The method of claim 1, further comprising:
determining that a portion of directory service data was removed for a particular account;
implementing the standby directory service for the host directory service;
identifying the portion of directory service data that was removed; and
updating the standby directory service based on the identified portion of directory service data.

15. A computer-implemented method comprising:
at a device comprising one or more processors:
determining that an interruption event has occurred at a host directory service, wherein the device and the host directory service are communicatively coupled via a first network protocol associated with a first network; and
in response to determining that the interruption event has occurred at the host directory service, implementing a standby directory service within an isolated virtual machine environment, wherein the standby directory service comprises a virtual machine or a set of virtual machines and corresponding network infrastructure elements associated with the isolated virtual machine environment, wherein the standby directory service is iteratively generated and updated within the isolated virtual machine environment via a second network protocol associated with a second network that is different than and isolated from the first network protocol, wherein each iteration of generating the standby directory service replaces a previous iteration of the standby directory service.

16. The method of claim 15, further comprising:
in response to implementing the standby directory service for the host directory service, iteratively performing a standby event process for a restored network environment associated with the standby directory service.

17. The method of claim 16, wherein the standby event process comprises at least one of installing additional backup and recovery software, performing a potential threat analysis on the first network, performing a data and service consistency check, and sending a notification to a client device.

18. The method of claim 15, wherein the interruption event is determined based on detecting changes of one or more objects associated with the host directory service.

19. The method of claim 15, wherein determining that the interruption event has occurred is based on at least one of:
determining irreversible changes of schema occurred at the host directory service;
determining a number of irreversible changes of objects at the host directory service exceeded a threshold; or
determining that a natural disaster occurred at a location of the host directory service.

20. The method of claim 15, wherein the host directory service comprises a set of domain controllers and metadata corresponding to network infrastructure and additional services associated with the host directory service.

21. The method of claim 20, wherein implementing the standby directory service for the host directory service comprises recovering directory data and the metadata corresponding to each domain controller based on determined backup and recovery instructions.

22. The method of claim 15, wherein the second network comprises an isolated recovery environment that is separated from the first network.

23. The method of claim 15, wherein the standby directory service is automatically updated based on a schedule selected from a plurality of backup and recovery options at a client device.

24. The method of claim 15, wherein setup instructions for initiating the standby directory service are configured to automatically modify network settings associated with the host directory service to use the standby directory service in place of the host directory service.

25. The method of claim 15, wherein the corresponding network infrastructure elements of the standby directory service comprises at least one of network switches, storages, and firewalls.

26. A non-transitory computer-readable storage medium, storing program instructions executable on a device including one or more processors to perform operations comprising:
- determining that an interruption event has occurred at a host directory service, wherein a device and the host directory service are communicatively coupled via a first network protocol associated with a first network; and
- in response to determining that the interruption event has occurred at the host directory service, implementing a standby directory service within an isolated virtual machine environment, wherein the standby directory service comprises a virtual machine or a set of virtual machines and corresponding network infrastructure elements associated with the isolated virtual machine environment, wherein the standby directory service is iteratively generated and updated within the isolated virtual machine environment via a second network protocol associated with a second network that is different than and isolated from the first network protocol, wherein each iteration of generating the standby directory service replaces a previous iteration of the standby directory service.

27. The non-transitory computer-readable storage medium of claim 26, wherein the program instructions further cause the one or more processors to perform operations comprising:
- in response to implementing the standby directory service for the host directory service, iteratively performing a standby event process for a restored network environment associated with the standby directory service.

28. The non-transitory computer-readable storage medium of claim 27, wherein the standby event process comprises at least one of installing additional backup and recovery software, performing a potential threat analysis on the first network, performing a data and service consistency check, and sending a notification to a client device.

29. The non-transitory computer-readable storage medium of claim 26, wherein the interruption event is determined based on detecting changes of one or more objects associated with the host directory service.

30. The non-transitory computer-readable storage medium of claim 26, wherein determining that the interruption event has occurred is based on at least one of:
- determining irreversible changes of schema occurred at the host directory service;
- determining a number of irreversible changes of objects at the host directory service exceeded a threshold; or
- determining that a natural disaster occurred at a location of the host directory service.

31. The non-transitory computer-readable storage medium of claim 26, wherein the host directory service comprises a set of domain controllers and metadata corresponding to network infrastructure and additional services associated with the host directory service.

32. The non-transitory computer-readable storage medium of claim 31, wherein implementing the standby directory service for the host directory service comprises recovering directory data and the metadata corresponding to each domain controller based on determined backup and recovery instructions.

* * * * *